United States Patent [19]

Beller et al.

[11] Patent Number: 4,895,519

[45] Date of Patent: * Jan. 23, 1990

[54] AUDIO-FREQUENCY CONVERTER APPARATUS, INSTALLATION INCLUDING SAID APPARATUS FOR TREATING SUBJECTS SUFFERING FROM AUDIO-PHONATORY AND AUDITIVE-VERBAL DISORDERS, AND A METHOD OF USING SUCH AN INSTALLATION

[75] Inventors: Isi Beller, 51, rue Saint-André-des-Arts, 75006 Paris; Boris Fradin, Noisy s/Ecole, both of France

[73] Assignee: I. Beller, Paris, France

[*] Notice: The portion of the term of this patent subsequent to Nov. 24, 2004 has been disclaimed.

[21] Appl. No.: 125,757

[22] Filed: Nov. 23, 1987

Related U.S. Application Data

[63] Continuation of Ser. No. 756,231, Jul. 18, 1985, Pat. No. 4,708,657.

[30] Foreign Application Priority Data

Jul. 27, 1984 [FR] France ............................. 84 12019

[51] Int. Cl.⁴ .............................................. H04R 3/12
[52] U.S. Cl. .................................... 434/185; 434/320; 360/19.1; 364/513.5; 381/150
[58] Field of Search ................... 434/185, 320; 381/6, 381/150, 179; 358/316, 321; 360/19.1; 179/1.5 R, 1.5 M; 333/154, 187; 364/513, 513.5

[56] References Cited

U.S. PATENT DOCUMENTS

| | | | |
|---|---|---|---|
| 4,615,680 | 10/1986 | Tomatis | 434/185 |
| 4,685,448 | 8/1987 | Shames et al. | 434/185 |
| 4,708,657 | 11/1987 | Beller et al. | 434/185 |

Primary Examiner—Edward M. Coven
Assistant Examiner—Jessica J. Harrison
Attorney, Agent, or Firm—Browdy and Neimark

[57] ABSTRACT

Audio-frequency converter apparatus, in particular for treating subjects suffering from audio-phonatory disorders, the apparatus being suitable for generating, on the basis of an input audio frequency signal, a parametric signal for application via an electro-acoustic transducer to a person being treated. Included in the apparatus are an input amplifier, a first threshold detector connected to the output from the input amplifier and subtracting a threshold voltage from the voltage supplied from the amplifier, after rectification, a second threshold detector, likewise connected to the output from the input ampifier, and adding a voltage threshold to the signal from the input amplifier, after rectification, and having a time constant which is not less than the time constant of the first detector, a voltage controlled oscillator circuit connected to the output from the first threshold detector, and a (balanced) modulator whose two inputs are respectively connected to the outputs from the second threshold detector and from the oscillator circuit, and whose output provides the parametric signal.

9 Claims, 1 Drawing Sheet

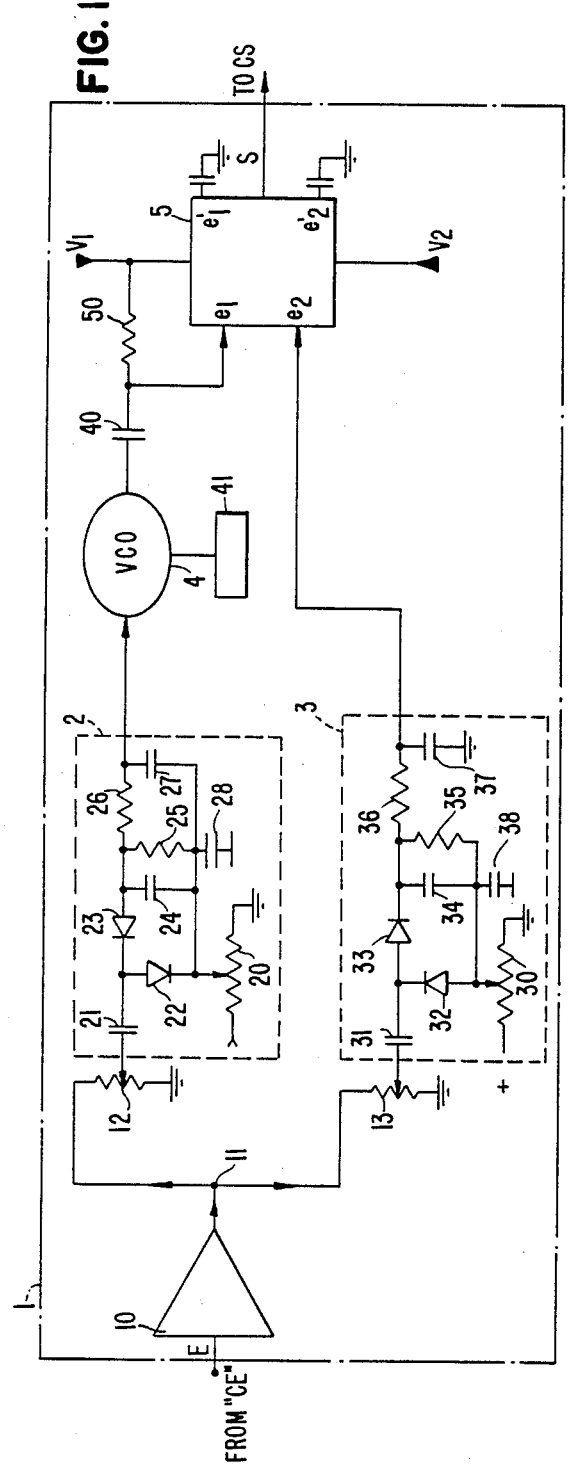
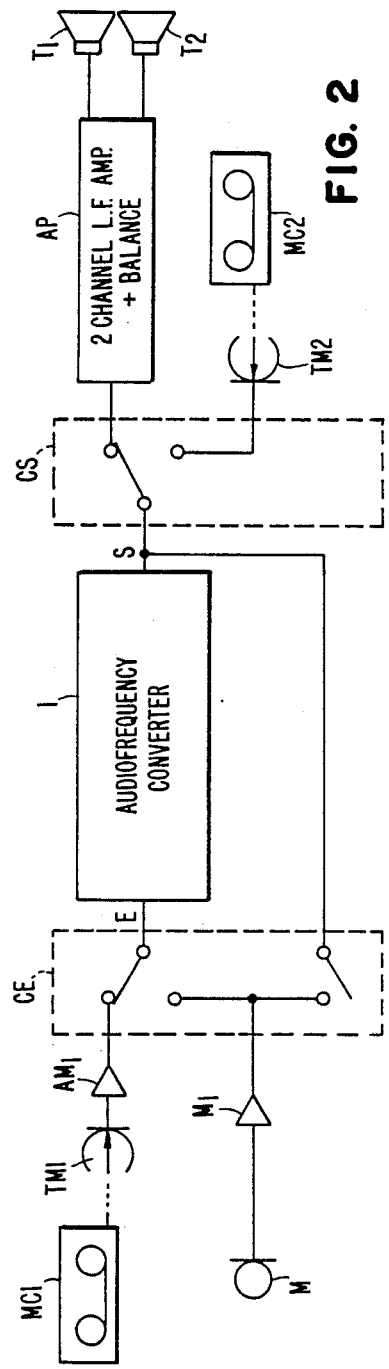

AUDIO-FREQUENCY CONVERTER APPARATUS, INSTALLATION INCLUDING SAID APPARATUS FOR TREATING SUBJECTS SUFFERING FROM AUDIO-PHONATORY AND AUDITIVE-VERBAL DISORDERS, AND A METHOD OF USING SUCH AN INSTALLATION

This is a continuation of application Ser. No. 06/756,231 filed Jul. 18, 1985, issued on Nov. 24, 1987 as U.S. Pat. No. 4,708,657.

The invention relates to an installation for audio treatment of audio-phonatory and auditive-verbal disorders present in certain subjects, generally young children.

BACKGROUND OF THE INVENTION

It has been observed that some language anomalies (dysphasia) or writing anomalies (dyslexia) are related to dysfunction in the auditive-verbal perception of the subject, which dysfunction appears during the development of language in the subject.

Various solutions have already been proposed for reeducating said perception. In particular, the Applicant's French Pat. No. 77 01 233, published under No. 2 377 189, suggests applying frequency modulation to an audio signal inversely to the modulation level of a pilot signal.

This prior installation has given only partial satisfaction, and the present invention seeks to improve it.

SUMMARY OF THE INVENTION

The present invention provides an audio-frequency converter apparatus comprising, in combination:
an input amplifier;
a first threshold detector connected to the output from the input amplifier and subtracting a threshold voltage from the voltage supplied from the input amplifier, after rectification;
a second threshold detector, likewise connected to the output from the input amplifier, and adding a voltage threshold to the signal from the input amplifier, after rectification, and having a time constant which is not less than the time constant of the first detector;
a voltage controlled oscillator circuit connected to the output from the first threshold detector; and
a modulator whose two inputs are respectively connected to the outputs from the second threshold detector and from the oscillator circuit, and whose output provides the said parametric signal, e.g. for application to one or more electroacoustic transducers.

Preferably, the time constant of the first detector is about 0.05 seconds and the time constant of the second detector is about 0.3 seconds.

In a particular embodiment, both threshold detectors are connected to the output of the input amplifier via respective level-adjusting units.

It is also advantageous for the thresholds of the two detectors to be individually adjustable.

More particularly, the threshold of the first detector and/or the frequency produced at rest by the voltage controlled oscillator are adjusted in such a manner that the frequency of the oscillator at rest is close to the upper limit of the hearing range, which may vary with the subject, and the threshold of the second detector is adjusted in such a manner that the amplitude of the output signal from the modulator is substantially nil when the oscillator is at its rest frequency.

According to other features of the invention:
the oscillator may be subjected to rapid frequency sweeping at a rate which is imperceptible to the human ear;
the oscillator may operate over a narrow frequency band whose average frequency is then a function of the output from the first detector; and
the oscillator may emit a signal whose harmonic content depends on the output from the first threshold detector.

The invention also relates to an installation including such apparatus and further including an input switch suitable for connection to a sound reader and/or to a microphone, and an output switch suitable for connection to a sound reproduction chain or to a sound recording chain, the input switch being connected to the input amplifier and the output switch being connected to the output from the modulator.

BRIEF DESCRIPTION OF THE DRAWING

An embodiment of the invention is described by way of example with reference to the accompanying drawing, in which:
FIG. 1 is a circuit diagram of a converter per se in accordance with the present invention; and
FIG. 2 is a block diagram of an installation incorporating the FIG. 1 converter.

DETAILED DESCRIPTION OF THE INVENTION

In FIG. 1, with reference 1 designates a portion of the apparatus, referred to as a "parameter converter" hereinafter, in this case the parameter being an audio-frequency signal. This signal has an input E and an output S. Its input E is intended to receive a natural audio-frequency signal, in other words an input signal representative of speech or voice or music which may come from a normal person, from the subject being treated, or from a source of music.

The natural input signal is applied to the input of a wideband amplifier 10 having an output 11 which is applied to two level-adjusting units 12 and 13 which are constituted by potentiometers in the present example.

The slider of the potentiometer 12 is connected to a first threshold detector 2, and the slider of the potentiometer 13 is connected to a second threshold detector 3.

The threshold detector 2 comprises a capacitor 21 having one plate connected to the slider of the potentiometer 12 and having its other plate connected to the anode of a diode 22 and to the cathode of a diode 23. The cathode of the diode 22 is connected to the slider of a potentiometer 20 which is connected between a reference voltage of positive sign and ground and it is also connected to one plate of a capacitor 24 whose other plate is connected to the anode of the diode 23. A resistor 25 is connected in parallel with the capacitor 24. The anode of the diode 23 is also connected to one end of the resistor 26 whose other end is connected to a plate of a capacitor 27 whose other plate is connected to the slider of a potentiometer 20. The common point between the resistor 26 and the capacitor 27 defines the output of the first threshold detector 2, which output is applied to a voltage-controlled oscillator (VCO) 4. Finally capacitor 28 is connected between the slide of potentiometer 20 and ground.

The structure of the second threshold detector 3 is similar to that of the first. The slider of the potentiometer 13 is connected via a capacitor 31 to the cathode of a diode 32 and to the anode of a diode 33 the diodes 32 and 33 are connected with polarities opposite those of diodes 22 and 23. The anode of the diode 32 is connected to the slider of a potentiometer 30 which receives a reference voltage of positive sign at its terminals. The cathode of the diode 33 is connected to a plate of a capacitor 34 whose other plate is connected to the slider of a potentiometer 30. A resistor 35 is connected in parallel with the capacitor 34. The cathode of the diode 33 is also connected to one end of a resistor 36 whose other end is connected to a plate of a capacitor 37 whose other plate is connected to ground. The common point between the resistor 36 and the capacitor 37 constitutes the output from the second threshold detector. A capacitor 38 is connected between the slider of potentiometer 30 and ground.

The output from the VCO 4 is applied via a capacitor 40 to one input $e_1$ of a modulator 5. The modulator receives two bias voltages $V_1$ and $V_2$. Its input $e_1$ is connected to the bias voltage $V_1$ via a resistor 50.

A second input $e_2$ of the modulator 5 receives the output from the second threshold detector 3. Finally, the outputs from the modulator 5, constitute the output terminals of the parameter converter 1.

The parameter modulator 5 can be a balanced modulator, in which case its inputs $e'_1$ and $e'_2$ are AC grounded.

The person skilled in the art will understand that the first detector 2 detects or rectifies its input signal, acting as a voltage doubler relative to the threshold as defined by the potentiometer 20. With the illustrated polarities of the diodes 22 and 23 detection takes place for values below the threshold. When the input signal is greater than threshold, the output signal equals the threshold; when the input signal is lower than the threshold, the output signal is defined by the (negative) deviation (rectified and voltage doubled) between the input signal and the threshold. Consequently the output voltage from the first detector appears negatively with respect to the threshold as defined by the potentiometer 20. A high value capacitor 28 prevents AC voltages from appearing at the terminals of said potentiometer. Further, the components 20 to 27 define a time constant which is about 0.05 seconds for the first threshold detector.

In contrast, the second threshold detector 3 operates the other way round. When its input voltage is below the threshold, the detector 3 provides an output voltage having the same sign and value as the threshold defined by the potentiometer 30.

When the input voltage of detector 3 is greater than the threshold, then its output signal is comprised of the portion (rectified and voltage doubled) of the input signal that exceeds the threshold. There thus appears across the terminals of the capacitor 37 a voltage which is the sum of the threshold voltage and the rectified voltage. The components 30 to 37 are selected to give the second threshold detector a time constant of about 0.3 seconds.

The apparatus can be adjusted in various manners which will be described in greater detail below. In normal operation, the threshold of the first detector 2 (and where necessary of the VCO 4) are adjusted so that the frequency of the oscillator 4 when at rest is close to the upper limit of the hearing range, which may be predetermined as being 17,000 Hz, or which may be determined as a function of a particular subject's response as analyzed using an audiogram. The threshold of the second detector is adjusted so that the amplitude of the output signal from the modulator 5 is substantially nil when the oscillator 4 is at its rest frequency and the voltage provided by the detector 3 is nil, since it could disturb the adjustment.

In other words, modulator 5 multiplies the VCO output (applied to its input,) with the output signal (applied to its input $e_2$) of the second threshold detector 3.

At rest, the outputs of both threshold detectors 2 and 3 are at their respective threshold values, and modulator 5 delivers no signal (theoretically a signal at rest frequency, e.g. 17,000 Hz, of VCO 4, but having a zero amplitude due to the other input $e_2$).

Otherwise, voltage obtained at the output S of modulator 5 has a frequency which varies with the amount of modulation. This modulation frequency goes down as a function of the modulation level, and with an amplitude which is exactly proportional to the amplitude of the input signal $e_2$.

In a particular embodiment, the diodes 22, 23, 32 and 33 are 1N 44 48 type diodes. The potentiometer 20 is a 20 kohm potentiometer, the capacitors 21, 24, and 27 are respectively 0.1, 0.22, and 0.1 microfarad capacitors, and the resistors 25 and 26 are 0.1 Mohm resistors. The capacitor 28 is a 10 microfarad capacitor.

In the other threshold detector, the potentiometer 30 is a 20 kohm potentiometer, the capacitors 31, 34, and 37 are respectively 0.47, 0.22 and 0.1 microfarad capacitors, and the resistors 35 and 36 are respectively 0.15 and 0.33 Mohm resistors. The capacitor 38 is a 100 microfarad capacitor.

The oscillator circuit 4 may be an astable multivibrator preceded by an emitter-follower control stage.

When a fast frequency sweep is desired, an auxiliary oscillator 41 is added to the VCO 4. The same applies when it is desired to operate over a frequency band rather than at a single frequency.

Finally, the balanced modulator 5 may be a 1496G type integrated circuit as manufactured by Motorola. Its terminal number 1 receives the output from the second threshold detector. Its terminal number 10 receives the output from the oscillator circuit 4, which is interconnected with a filter device connected to terminal number 8. Terminal 14 is connected to ground. The bias voltage $V_1$ and $V_2$ are applied to the inputs 5 and 12 of the integrated circuit. Finally, the output from the integrated circuit is given on its terminal number 6.

FIG. 2 shows a preferred application of the parameter converter or audio-frequency converter 1 shown in FIG. 1 in an installation for treating subjects. The converter is connected to an input switch CE and an output switch CS. The switch CE serves to connect the input E of the converter 1 either to the read output from a magnetic head TM1 in a cassette recorded MC1, preferably a high quality recorder, or else to the output from a microphone M which should also be a high quality microphone. Each of these inputs may be amplified via respective preamplifiers AM1 and M1.

The output S from the converter 1 is applied via the output switch CS either to a two-channel sound reproduction chain AP, or else to the recording input of a magnetic head TM2 in a cassette recorder MC2, which may be the same recorder as the cassette recorder MC1.

It is advantageous for the switches CE and CS to enable a direct connection of the microphone M, the amplifier AP, and the recorder MC2.

To re-educate subjects suffering auditive-verbal dysfunction, it is desirable for the sound reproduction chain AP to include, in known manner, means for individual level adjustments and for balancing each channel, associated with accurate measurement means, and outputs for electro-acoustic transducers, e.g. loudspeakers $T_1$, $T_2$, for use with the left and right ears, respectively, of the subject. It is also advantageous to be able to supply the amplifier AP simultaneously with the voltage E and S from the converter 1, with each level being independently adjustable. Finally, the ratio between the left and right levels may be different for E and S. Headphones are also provided to enable an operator to listen to the signal as reproduced, if so desired. All those adjustments are used in the example given hereinafter.

In the following, "comprehensible sounds" means natural sounds as available on input E of the converter (FIG. 2), and "parametric sounds" means processed sounds as available on output S of the converter 1.

An installation in accordance with the invention makes it possible to perform a method of treatment in which a mixture of comprehensible sounds and of parametric sounds provided by the installation are injected into each ear of the subject, with the ratio between the comprehensible sounds and parametric sounds (that is, sounds produced after processing a signal by the parameter converter) introduced into one ear being different from that of the other ear. As explained earlier, each of these ratios is independently adjustable.

It is possible by using such adjustments to avoid perception of any comprehensible or parametric sound in either ear.

Practical use of the apparatus of FIG. 2, where a dyslexic subject is considered, by is described in the following example. Re-education takes place in five stages over a period of four months and with at least two one-hour sessions per week. The adjustments of the parameter converter over such a period is as follows:

Example (for treating dyslexia)

In the first stage, a "passive stage" in which the input signal may comprise voice and music having a high level of high frequencies, the parametric sounds exhibit:
high amplitude with respect to natural sounds;
VCO rest frequency below the upper frequency threshold (i.e., a threshold above which sound becomes inaudible); and
maximum excursion of the VCO frequency (that is, the range of frequencies between which the parametric sound is modulated.)

In the second stage, a "semi-active stage" in which the input signal comprises music and "sibilants" (words with many "S" sounds) prerecorded for repetition by the subject, the parametric sounds have the following characteristics:
with respect to the music, adjustments are identical to those of stage 1;
with respect to the "sibilant" words, the VCO rest frequency is above the upper audible threshold; the average amplitude of parametric sounds is the same as that of the natural sounds and the excursions of the VCO are reduced.

In the third stage, an "active stage", "sibilants" and words of textual material are used, and the parametric sounds exhibit:
A VCO rest frequency above the upper frequency threshold;
low amplitude of parametric sounds with respect to natural sounds; and
low excursions of the VCO frequency.

In the fourth stage, texts and guided reading (with prerecorded tape) are used, and the characteristics of the parametric sounds are identical to those the preceding stage.

In the fifth stage, guided reading and free reading exercises are used, and the parametric sounds have essentially a zero amplitude with respect to the natural sounds.

In the above example, it is supposed that the oscillator circuit 4 generates a pure frequency, together with optional harmonics thereof.

It is possible to use numerous variants of the present invention, in particular concerning the oscillator circuit. It is thus possible to vary, for example:
the preferred frequencies of pink noise produced by the oscillator, or more precisely by an appropriate low frequency generator;
the wobble characteristic of a wobbling signal, i.e. a signal subjected to frequency sweeping;
the form factor of a squarewave signal produced by the oscillator; and
the harmonic content of the signal produced by the oscillator.

Moreover, it is also possible to simultaneously utilize a plurality of signals which are either in musical harmony or cover a narrow frequency band. The average frequency and the amplitude are then modified by the parameter converter as described above.

These variant embodiments make it easier to cover the resonant frequencies of the subject's inner ear within the band transmitted by the oscillator circuit.

The case in which it is desired to emit noise covering a band of frequencies in a permanent manner deserves special attention. It may be difficult to emit noise of this kind and to subject it to the various modulations proposed by the present invention. In such a case an oscillator circuit is used which emits a single sound at a time, which is in addition subjected to frequency sweeping over the prescribed band. This frequency sweeping may take place very rapidly, for example, 200,000 times per second so that the ear cannot perceive the sweeping and has the impression that the band is constantly occupied.

We claim:

1. A device for treating auditory disorders, comprising a parametric converter for converting from an audio signal supplied to said parametric converter at an input thereof to a parametric signal corresponding to said audio signal, said parametric signal being output from said parametric converter at an output thereof, said parametric converter comprising
first and second threshold detector means, each operatively connected to said input of said parametric converter, each for rectifying said audio signal with respect to a respective threshold and polarity of said audio signal, and each providing a respective output with a respective time constant, said time constant of said output of said second threshold detector means being greater than said time constant of said output of said first threshold detector means,
a voltage controlled oscillator receiving as an input said output of said first threshold detector means and providing an oscillating output having frequency that decreases with increase in said output of said first threshold means,
modulator means for receiving as a first input a signal corresponding to said oscillating output of said voltage controlled oscillator and as a second input said output of said second threshold detector means, and for outputting as said output of said parametric converter said parametric signal oscillating with said frequency of said first input to said modulator means with an envelope amplitude that increases with increase in said second input to said modulator means.

2. The device of claim 1, comprising combining means for simultaneously providing as an auditory signal to an ear of a patient with said auditory disorder a combined audio signal corresponding to a mixture of said parametric signal and audio signal, and said audio signal corresponds to normal sound of at least one of music and voice.

3. The device of claim 2, said combining means including means for effectively changing the ratio of said parametric signal to said normal sound in said auditory signal for said ear of said patient during a treatment of said patient for said auditory disorder.

4. The device of claim 2, comprising means for providing a respective one of said auditory signals to each of two ears of said patient, wherein said ratio of said parametric signal to said normal sound in said mixture of each said combined signal provided as the respective auditory signal to each of said ears of said patient can be varied independently during treatment for said auditory disorder.

5. The device of claim 1, each said threshold detector means comprising
- a respective first potentiomenter connected at a first terminal to ground and at a second terminal operatively to said input of said parametric converter,
- a respective first capacitor connected at a first end to a wiper of the respective first potentiometer,
- a respective second potentiometer connected at one end to ground,
- a respective first diode connected between a wiper of the respective second potentiometer and a second end of the respective first capacitor,
- a respective second diode connected at a first end to said second end of the respective first capacitor,
- a respective first resistor connected at a first end to a second end of the respective second diode, and at a second end to said output of the respective threshold determining means,
- a respective second resistor connected at a first end to said first end of the respective first resistor and at a second end to said wiper of the respective second potentiometer,
- a respective third capacitor connected at a first end to ground and at a second end to said wiper of the respective second potentiometer, and
- a respective fourth capacitor connected at a first end to said output of the respective threshold detector means.

6. A method for treating an auditory disorder of a patient, comprising providing to the ear of a patient an audio signal corresponding at least to a parametric signal in turn corresponding to an audio-frequency sound signal intended to be heard by the patient, said providing including generating said parametric signal based on said audio-frequency sound signal, wherein said providing of said parametric signal is such that said parametric signal decreases in frequency from a predetermined maximum frequency as said audio-frequency sound signal increases in amplitude with respect to a first threshold and polarity, and increases in amplitude from a first predetermined value with increase of said electronic signal with respect to a second threshold and polarity.

7. The method of claim 6, wherein said providing is such that said first predetermined value is operatively zero.

8. The method of claim 6, wherein said audio signal provided to an ear of said patient includes two audio components, a first of said audio components corresponding to said audio signal corresponding to said parametric signal, and the second of said audio components corresponding to said audio-frequency sound signal.

9. The method of claim 8, wherein the ratio of said two audio components in said audio signal provided to an ear of said patent is varied during said treatment.

* * * * *